Patented Nov. 25, 1941

2,263,666

UNITED STATES PATENT OFFICE 2,263,666

METHOD OF PREPARING ALKYL HALIDES

Alexander L. Wilson, Pittsburgh, Pa., assignor to Carbide and Carbon Chemicals Corporation, a corporation of New York No Drawing. Application May 5, 1938, Serial No. 206,173

17 Claims. (Cl. 260—652)

This invention is an improved process for making alkyl halides. The process broadly comprises the reaction of dialkyl sulfates with metal halides in aqueous solution, and the principal object of the invention is to provide a process of this class in which both alkyl groups of the dialkyl sulfate are caused to react with halogens while hydrolysis of the dialkyl sulfate and other side reactions are suppressed. The conditions which make possible the achievement of this object include the use of metal halides which are capable of forming aqueous solutions containing high molar concentrations of the salt; the use of halides of metals whose sulfates are relatively insoluble in the reaction mixture; and the conduct of the reaction at relatively elevated temperatures between 90° and about 200° C. while maintaining a high concentration of the metal halide in the aqueous solution. The concentration of the metal halide can be kept high throughout the reaction by distilling water from the solution or by addition of the metal halide, or by both of these means. Preferably the process is carried out at temperatures of from 100° to about 140° C., and the salt concentration is kept high by the removal of water in a distillate. These conditions provide quantities of the metal halide in the reaction mixture which are considerably in excess of those required for reaction with both alkyl groups of the dialkyl sulfate.

The halides of the alkaline earth metals are more highly soluble in water than those of any other metals, and calcium, barium, strontium, and beryllium halides are intended for use in this invention. The chlorides and bromides of calcium and barium are preferred. Suitable dialkyl sulfates are the lower members of this series, such as dimethyl sulfate, diethyl sulfate, dipropyl and diisopropyl sulfates, and dibutyl and diisobutyl sulfates.

The alkaline earth metals, as a class, form relatively insoluble sulfates, and this is particularly true in the present process wherein the sulfates of all of these metals are but very slightly soluble in the concentrated salt solutions of the reaction mixture. This fact assists in obtaining good rates of reaction in the desired direction. The hydrolysis of dialkyl sulfates to form alcohol is a reaction competing directly with the desired reaction to form alkyl halides. It has been found, however, that this reaction is largely suppressed in aqueous solutions which contain high concentrations of the metal halides.

Thus, the invention provides reaction at relatively high temperatures in solutions of halides of metals yielding insoluble sulfates to induce the reaction of both alkyl groups of the dialkyl sulfates, and the reaction is directed toward the alkyl halide rather than toward competing reactions by the choice of metal halides capable of forming aqueous solutions of high molar concentration and whose sulfates do not reduce this concentration.

Saturated or substantially saturated aqueous solutions of the metal halides are preferably employed, and it will be understood that this refers primarily to saturation at ordinary temperatures, since the handling and storage of solutions containing undissolved solids present practical difficulties. Of course, by the addition of metal halide to the solution heated to its reaction temperature, the concentration can be increased.

The following examples will serve to illustrate the invention:

Example I

A saturated solution of 5.7 moles of calcium chloride was heated to a temperature between 100° and 120° C. in a vessel equipped with a distilling column. Diethyl sulfate in an amount equivalent to 1.24 moles was then slowly added while the product was continuously distilled from the mixture. The distillate contained water and 2.16 moles of ethyl chloride, together with a small amount of diethyl sulfate amounting to 0.065 mole. Some unreacted diethyl sulfate also was left in the reaction vessel.

The yield of unpurified ethyl chloride was about 92%, based on both ethyl groups of diethyl sulfate.

Example II

A saturated solution of calcium chloride containing 10 moles (1110 grams) of the salt and 700 grams of water was heated to about 90° C. in a vessel provided with a reflux condenser, by means of which water could be removed from the distillate, following which more volatile materials were passed to and collected in a refrigerated receiver. Two additional moles (222 grams) of calcium chloride were then added to the salt solution. Two moles (308 grams) of diethyl sulfate were slowly added to the heated solution, which was maintained at a temperature between 90° and 100° C., the average temperature during the reaction being about 95° C. The vapors evolved were collected in the receiver after the removal of water by means of the reflux condenser.

The product contained 237 grams of ethyl chloride and 1 gram of diethyl sulfate. This is equivalent to a yield of 3.67 moles of the ethyl chloride or 92% of the theoretical yield, based on both available ethyl groups.

Example III

The data in tabular form below show the application of this invention to the reactions of diethyl sulfate with calcium bromide and barium chloride, respectively, and the reactions of dimethyl sulfate with calcium chloride and barium bromide, respectively.

|  | $CaBr_2$ | $BaCl_2$ | $CaCl_2$ | $BaBr_2$ |
|---|---|---|---|---|
| Salt charged_____moles__ | 2.25 | 3.0 | 4.0 | 2.0 |
| Diethyl sulfate_____do____ | 0.75 | 1.0 |  |  |
| Dimethyl sulfate_____do____ |  |  | 0.87 | 0.67 |
| Concentration of salt solution percent by weight__ | 75 | 34 | 50 | 60 |
| Reaction temperature_____°C__ | 105–110 | 104 | 120–125 | 95–110 |
| Alkyl halide recovered___moles__ | 1.23 | 0.79 | 1.43 | 1.15 |
| Yield (on the basis of both alkyl groups)_____percent__ | 82 | 40 | 83 | 86 |

In each instance the dialkyl sulfate was added to the reaction mixture in portions from time to time. Water and the alkyl halide formed were removed continuously from each reaction as a distillate. The alkyl halide was collected in a refrigerated receiver after the removal of water from the distillate. In the reaction involving barium chloride, an aqueous solution containing excess salt was used, and in the reaction of calcium chloride with dimethyl sulfate a portion of the salt was added to the reaction mixture as the reaction progressed.

Example IV

An embodiment of this invention of particular importance is the production of ethyl chloride from calcium chloride and diethyl sulfate. In the tabulated data below, five typical reactions illustrating this embodiment of the invention are detailed.

|  | Run No. | | | | |
|---|---|---|---|---|---|
|  | 1 | 2 | 3 | 4 | 5 |
| Calcium chloride charged_parts by weight__ | 723 | 1110 | 1320 | 1030 | 1110 |
| Diethyl sulfate charged_____do____ | 308 | 924 | 462 | 412 | 412 |
| Concentration of $CaCl_2$ solution percent by weight__ | 25 | 36 | 60 | 49 | 47 |
| Temperature reaction_____°C__ | 105 | 111 | 135 | 127 | 115 |
| Ethyl chloride recovered__parts by weight__ | 128 | 418 | 286 | 288 | 326 |
| Yield ethyl chloride_____percent__ | 47 | 54 | 76 | 81 | 84 |

In each reaction, diethyl sulfate was added continuously and a distillate containing the ethyl chloride together with small quantities of alcohol, water and hydrochloric acid was continuously removed. This mixture was redistilled to recover pure ethyl chloride. The calcium sulfate formed was virtually insoluble in the reaction mixture and it was allowed to accumulate in the reaction vessel until the residue become too thick to be readily stirred. The calcium sulfate can be readily removed from the liquid products in the reaction vessel by filtration.

Variations in the procedures specifically outlined above will be apparent. For example, the dialkyl sulfate and the metal halide may be added in a single batch or both may be added continuously. It is also possible to withdraw the calcium sulfate continuously as it is formed. The calcium chloride may be supplied either in solid form or in aqueous solution. Free acid which may develop in the reaction mixture can be neutralized if desired by the addition of suitable alkaline materials. Lime has proved to be particularly effective for this purpose.

It will be seen that the process of this invention provides a simple and efficient method for making alkyl halides. It is particularly desirable from the standpoint of economy since the alkaline earth metal chlorides, particularly calcium chloride, provide a readily available and cheap source of chlorine.

This application contains subject matter in common with my application Serial No. 80,718 filed May 20, 1936.

The process described is capable of modification in various ways, and such modifications are included within the scope of the invention as defined by the appended claims.

I claim:

1. Process for making a lower alkyl halide from the corresponding dialkyl sulfate and a metal halide, which comprises forming an aqueous solution of a halide of a metal whose said halide is capable of dissolving in water in high molar concentrations and whose sulfate is substantially insoluble in concentrated solutions of said halide, said aqueous solution being substantially saturated at least at ordinary temperatures, and heating said solution to between 90° and about 200° C. together with the dialkyl sulfate while maintaining the concentration of said halide in said solution at least at substantially its initial concentration.

2. Process for making a lower alkyl halide from the corresponding dialkyl sulfate and a metal halide, which comprises forming an aqueous solution of a halide of a metal whose said halide is capable of dissolving in water in high molar concentrations and whose sulfate is substantially insoluble in concentrated solutions of said halide, said aqueous solution being substantially saturated at least at ordinary temperatures, and heating said solution to between 90° and about 200° C. together with the dialkyl sulfate while maintaining the concentration of said halide in said solution at least at substantially its initial concentration by adding metal halide to the solution.

3. Process for making a lower alkyl halide from the corresponding dialkyl sulfate and a metal halide, which comprises forming an aqueous solution of a halide of a metal whose said halide is capable of dissolving in water in high molar concentrations and whose sulfate is substantially insoluble in concentrated solutions of said halide, said aqueous solution being substantially saturated at least at ordinary temperatures, and heating said solution to between 90° and about 200° C. together with the dialkyl sulfate while maintaining the concentration of said halide in said solution at least at substantially its initial concentration by removing a distillate containing water from said solution during the reaction.

4. Process for making a lower alkyl halide from the corresponding dialkyl sulfate and a metal halide, which comprises forming an aqueous solution of a halide of a metal whose said halide is capable of dissolving in water in high molar concentrations and whose sulfate is substantially insoluble in concentrated solutions of said halide, said aqueous solution being substantially saturated at least at ordinary temperatures, and heating said solution between about 100° and about 140° C. together with the dialkyl sulfate while removing the alkyl halide from the reaction and maintaining the concentration of the metal halide in said solution at least at substantially its initial concentration by removing a distillate containing the alkyl halide and water.

5. Process for making a lower alkyl halide from the corresponding dialkyl sulfate and an alkaline earth metal halide, which comprises forming an aqueous solution of an alkaline earth metal halide, said aqueous solution being substantially saturated at least at ordinary temperatures, and heating said solution to between 90° and about 200° C. together with the dialkyl sulfate while maintaining the concentration of the alkaline earth metal halide in said solution at least at substantially its initial concentration.

6. Process for making a lower alkyl halide from the corresponding dialkyl sulfate and an alkaline earth metal halide, which comprises forming an aqueous solution of an alkaline earth metal halide, said aqueous solution being substantially saturated at least at ordinary temperatures, and heating said solution to between about 100° and about 140° C. together with the dialkyl sulfate while removing the alkyl halide from the reaction and maintaining the concentration of the alkaline earth metal halide in said solution at least at substantially its initial concentration by removing a distillate containing said alkyl halide and water.

7. Process for making a lower alkyl halide from the corresponding dialkyl sulfate and an alkaline earth metal halide in which both alkyl groups of said sulfate are largely caused to react with halogen, which comprises forming an aqueous solution of calcium chloride, said aqueous solution being substantially saturated at least at ordinary temperatures, heating said solution to between 90° and about 200° C. together with the dialkyl sulfate, and removing the alkyl halide from the reaction in a distillate.

8. Process for making a lower alkyl halide from the corresponding dialkyl sulfate and an alkaline earth metal halide in which both alkyl groups of said sulfate are largely caused to react with halogen, which comprises forming an aqueous solution of calcium bromide, said aqueous solution being substantially saturated at least at ordinary temperatures, heating said solution to between 90° and about 200° C. together with the dialkyl sulfate, and removing the alkyl halide from the reaction in a distillate.

9. Process for making a lower alkyl halide from the corresponding dialkyl sulfate and an alkaline earth metal halide in which both alkyl groups of said sulfate are largely caused to react with halogen, which comprises forming an aqueous solution of barium chloride, said aqueous solution being substantially saturated at least at ordinary temperatures, heating said solution to between 90° and about 200° C. together with the dialkyl sulfate, and removing the alkyl halide from the reaction in a distillate.

10. Process for making an alkyl halide of the group consisting of methyl, ethyl, propyl, isopropyl, butyl and isobutyl halides from the corresponding dialkyl sulfate and an alkaline earth metal halide in which both alkyl groups of said sulfate are largely caused to react with halogen, which comprises forming an aqueous solution of an alkaline earth metal halide, said aqueous solution being substantially saturated at least at ordinary temperatures, heating said solution to between 90° and about 200° C. together with said dialkyl sulfate, and removing said alkyl halide from the reaction in a distillate.

11. Process for making an alkyl halide of the group consisting of methyl, ethyl, propyl, isopropyl, butyl and isobutyl halides from the corresponding dialkyl sulfate and an alkaline earth metal halide in which both alkyl groups of said sulfate are largely caused to react with halogen, which comprises forming an aqueous solution of calcium chloride, said aqueous solution being substantially saturated at least at ordinary temperatures, heating said solution to between 90° and about 200° C. together with said dialkyl sulfate, and removing said alkyl halide from the reaction in a distillate.

12. Process for making an alkyl halide of the group consisting of methyl, ethyl, propyl, isopropyl, butyl and isobutyl halides from the corresponding dialkyl sulfate and an alkaline earth metal halide in which both alkyl groups of said sulfate are largely caused to react with halogen, which comprises forming an aqueous solution of calcium bromide, said aqueous solution being substantially saturated at least at ordinary temperatures, heating said solution to between 90° and about 200° C. together with said dialkyl sulfate, and removing said alkyl halide from the reaction in a distillate.

13. Process for making an alkyl halide of the group consisting of methyl, ethyl, propyl, isopropyl, butyl and isobutyl halides from the corresponding dialkyl sulfate and an alkaline earth metal halide in which both alkyl groups of said sulfate are largely caused to react with halogen, which comprises forming an aqueous solution of barium chloride, said aqueous solution being substantially saturated at least at ordinary temperatures, heating said solution to between 90° and about 200° C. together with said dialkyl sulfate, and removing said alkyl halide from the reaction in a distillate.

14. Process for making a methyl halide which comprises forming an aqueous solution of a halide of an alkaline earth metal, said aqueous solution being substantially saturated at least at ordinary temperatures, heating said solution to between 90° and about 200° C. in the presence of dimethyl sulfate, and removing the methyl halide from the reaction in a distillate.

15. Process for making an ethyl halide which comprises forming an aqueous solution of a halide of an alkaline earth metal, said aqueous solution being substantially saturated at least at ordinary temperatures, heating said solution to between 90° and about 200° C. in the presence of diethyl sulfate, and removing the ethyl halide from the reaction in a distillate.

16. Process for making ethyl chloride which comprises forming an aqueous solution of calcium chloride, said aqueous solution being substantially saturated at least at ordinary temperatures, and heating said solution between about 100° and about 140° C. with diethyl sulfate while removing the ethyl chloride in a distillate.

17. Method of forming ethyl chloride comprising reacting diethyl sulfate with substantially saturated aqueous solutions of calcium chloride at temperatures between about 110° and about 135° C.

ALEXANDER L. WILSON.